US008644265B2

(12) United States Patent
Wang (10) Patent No.: US 8,644,265 B2
(45) Date of Patent: Feb. 4, 2014

(54) WIDEBAND ANALOG CHANNEL INFORMATION FEEDBACK

(76) Inventor: Xiao-an Wang, Allentown, PA (US)

( * ) Notice: Subject to any disclaimer, the term of this patent is extended or adjusted under 35 U.S.C. 154(b) by 168 days.

(21) Appl. No.: 13/249,238

(22) Filed: Sep. 30, 2011

(65) Prior Publication Data

US 2013/0083778 A1 Apr. 4, 2013

(51) Int. Cl.
*H04W 40/00* (2009.01)
*H04W 92/00* (2009.01)
*H04L 27/28* (2006.01)
*H04B 7/216* (2006.01)

(52) U.S. Cl.
USPC ........... 370/335; 455/445; 375/142; 375/150; 375/260

(58) Field of Classification Search
USPC ......... 370/335; 375/142, 150, 358; 455/1, 69, 455/213
See application file for complete search history.

(56) References Cited

U.S. PATENT DOCUMENTS

| | | | | |
|---|---|---|---|---|
| 5,574,516 | A * | 11/1996 | Kanai et al. | 348/742 |
| 5,691,974 | A * | 11/1997 | Zehavi et al. | 370/203 |
| 5,761,088 | A * | 6/1998 | Hulyalkar et al. | 348/614 |
| 6,134,262 | A * | 10/2000 | Kitade et al. | 375/142 |
| 6,515,980 | B1 * | 2/2003 | Bottomley | 370/342 |
| 6,781,980 | B1 * | 8/2004 | Dajer et al. | 370/342 |
| 6,947,509 | B1 * | 9/2005 | Wong | 375/350 |
| 7,778,607 | B2 * | 8/2010 | Withers et al. | 455/67.11 |
| 2003/0017835 | A1 * | 1/2003 | Bergel | 455/502 |
| 2003/0035469 | A1 * | 2/2003 | Frank et al. | 375/150 |
| 2004/0017309 | A1 * | 1/2004 | Bortnyk et al. | 342/189 |
| 2006/0018279 | A1 * | 1/2006 | Agrawal et al. | 370/330 |
| 2008/0125109 | A1 * | 5/2008 | Larsson et al. | 455/424 |
| 2009/0296850 | A1 * | 12/2009 | Xu et al. | 375/295 |
| 2009/0323564 | A1 * | 12/2009 | Chiu | 370/280 |
| 2010/0285739 | A1 * | 11/2010 | Wang et al. | 455/9 |
| 2010/0309811 | A1 * | 12/2010 | Tanaka et al. | 370/253 |
| 2011/0096867 | A1 * | 4/2011 | Kang et al. | 375/295 |

FOREIGN PATENT DOCUMENTS

WO WO2010099855 * 9/2010

* cited by examiner

*Primary Examiner* — Hassan Kizou
*Assistant Examiner* — Tejis Daya (57) ABSTRACT

Multipoint broadcasting requires that the downlink-channel information be available at collaborating base stations. Methods and apparatus for wideband analog channel feedback are described that provide downlink-channel information feedback from mobile users to base stations via uplink channels, and that use very few or no resources of the RAT of the wireless cellular network. Also described are methods and apparatus that perform channel-feedback signal cancellation at base stations to reduce its interference on the uplink-traffic signal. Wideband analog channel feedback is adaptable to the feedback bandwidth in uplink, and it offers frequency diversity to combat the deep fading in feedback channels. Wideband analog channel feedback is also applicable to uplink channel-information feedback. Applications of the described methods and apparatus include multipoint broadcasting in a wireless cellular network, and more generally, channel feedback between two communicating devices in a communications network.

24 Claims, 11 Drawing Sheets

(a) spectrum of the channel-feedback signal

(b) spectrum of the uplink-traffic signal (c) spectrum of the combined signal

(a)
spectrum of the downlink-channel (b)
spectrum of the downlink-channel fed back via uplink

WIDEBAND ANALOG CHANNEL INFORMATION FEEDBACK

BACKGROUND

1. Field of Application

The following description relates generally to telecommunications systems and wireless communications systems.

2. Prior Art

The capacity of a wireless cellular network has been limited by interferences. For example, a mobile user may experience excellent signal quality when it is very close to a base station. The signal quality quickly deteriorates, however, if the mobile user moves away from its serving base station and to the cell edge, where the signal from the serving base station is corrupted by the signals from neighboring base stations. Since within a cell there is more area to the cell edge than to the cell center, a mobile user is more likely to experience bad channels than good channels. Accordingly the average cell capacity can be a small fraction of the peak capacity achievable only at the cell center.

A set of neighboring cells in a cellular network can be considered as a multipoint broadcast system. The theory of Gaussian broadcast channels has established that by coordinating the transmissions of broadcasters, the capacity of the multipoint broadcast system approaches that of an MIMO (multiple input-antenna/multiple output-antenna) system, thus multipoint broadcasting in a wireless cellular network has the potential to increase the network capacity by many folds. Multipoint broadcasting has been adopted in LTE-A (Long-Term Evolution of $3^{rd}$ generation of wireless cellular network, Advanced) and is referred to as CoMP (Coordinated Multi-Point transmission).

Figure 1:
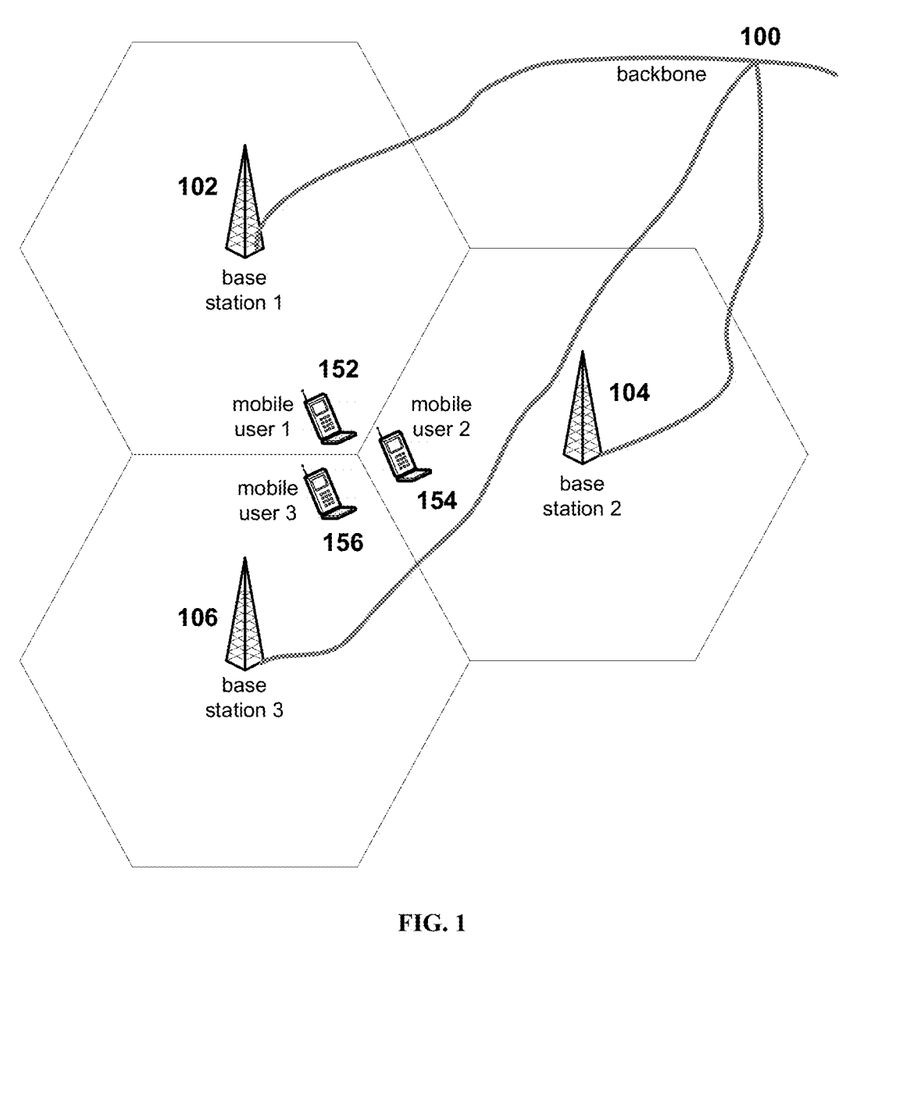
FIG. 1 illustrates a wireless cellular network that comprises a multipoint-broadcast set.

FIG. 1 illustrates an example multipoint broadcast system. Elements 102, 104, and 106 denote base stations 1, 2, and 3, respectively, and elements 152, 154, and 156 denote mobile stations 1, 2, and 3, respectively. Backbone 100 connects base stations 1, 2, and 3 to allow highspeed information exchange among the base stations. In FIG. 1, base stations 1, 2, and 3 form a set of collaborating multipoint broadcasters. Mobile users 1, 2, and 3 form a set of recipients. Base stations 1, 2, and 3, and mobile users 1, 2, and 3 together form a multipoint-broadcast set. Base stations 1, 2, and 3 transmit the combinations of the signals intended for mobile users 1, 2, and 3. At each base station, the combination "weight" for each mobile user signal can be different. Through elaborate algorithms, at each mobile user the desired signal in the received signal is enhanced whereas the undesired signal or the interference is cancelled or minimized. For example, when the transmitted signals from base stations 1, 2, and 3 arrive at mobile user 1, the signals for mobile users 2 and 3 are cancelled out or minimized, while the signal for mobile user 1 is maximized or enhanced, thus the signal quality of mobile user 1 improves significantly. Similarly, mobile users 2 and 3 will also see significant improvement in the quality of their respective signals. The combining of the different mobile-user signals at each base station is commonly referred to as "pre-coding". The combining weight for each mobile-user signal at for each base station is an element in a so called "pre-coding matrix".

The main difficulty in multipoint broadcasting is that it requires the full knowledge of the downlink channel (from base stations to mobile users) to be available at collaborating base stations for pre-coding. In an FDD (frequency-division duplex) network, the downlink channel information has to be fed back to the base stations by the mobile users via uplink channels. Typically, full channel feedback requires large amount of data, and the rapid channel changes often taking place in wireless channels require high feedback rate. These requirements lead to a feedback overhead that is often so large that little is left in uplink channel capacity for carrying useful data. In a TDD (time-division duplex) network, base stations can obtain the downlink-channel information from the uplink-channel information by channel reciprocity. Ideal channel reciprocity, however, exists only between the antennas of base stations and the mobile users. The transmitter (TX) and the receiver (RX) of a base station are generally different from those of a mobile user or other base stations. This introduces the differences in gains and phases between downlink and uplink channels, and destroys the channel reciprocity. Substantial efforts are needed to overcome the difference in the TX/RX chains to restore the channel reciprocity.

Without an effective approach to providing base stations the downlink channel information, the full potential of multipoint broadcasting will not be utilized in wireless cellular networks. Thus there is a strong need for a method, system, and apparatus that provide efficient downlink channel information feedback without diminishing the uplink channel capacity in FDD and without additional burdens to restore channel reciprocity in TDD.

SUMMARY

The following is a summary of one or more aspects in order to provide a basic understanding of such aspects. The purpose of the summary is to present some concepts of one or more aspects in a simplified form as a prelude to the more detailed descriptions that are to be presented later.

The subject disclosure provides for efficient channel feedback in communication systems. Traditionally, channel is fed back digitally, i.e., the channel information is fed back in the form of data, possibly encoded, using the dedicated resources of the same radio access technology (RAT). Examples of the RATs include orthogonal frequency division multiple-access (OFDM), time division multiple access (TDMA), and code division multiple access (CDMA). If the RAT is OFDM, certain OFDM subcarriers can be assigned to carry the data traffic for channel feedback. If the RAT is TDMA, certain time slots or part of a time slot can be used for channel feedback. Certain code channels can be assigned for channel feedback if the RAT is CDMA. The major drawback of such a traditional approach is that too many resources may have to be allocated for complete and reliable channel feedback and therefore too few resources are left for user data. The problem is further exacerbated in MIMO scenarios, including multipoint broadcasting, as the feedback load increases proportionally with the number of antennas involved.

In some aspects of the subject disclosure, a mobile user transmits a channel-feedback signal to a base station, the channel-feedback signal being a feedback-pilot sequence convolved by the downlink-channel impulse response. The base station is able to derive the downlink-channel impulse response from the feedback-pilot sequence and the uplink-channel estimate.

In one or more aspects, the channel-feedback signal comprises multiple downlink channels. Each downlink channel can be assigned independently to a random feedback-pilot sequence. Alternately, the feedback-pilot sequence for a downlink channel can be drawn from a family of orthogonal sequences.

In one or more other aspects, methods are provided that make the channel-feedback signal to be either a part, or independent, of the RAT that is employed in a wireless cellular network, depending on the type of the RAT in the network. In the former case, the feedback-pilot sequence is made to be the same as the chip sequence of a code channel in a CDMA network. In the latter case, the channel-feedback signal is superimposed to the signals of other RATs, e.g., OFDM. In either case, very few or no RAT resources are used for channel feedback, therefore the RAT resources of the network are freed up to carry the useful user data.

In one or more further aspects, methods are provided for cancelling the channel-feedback signal at base stations. Channel-feedback signal cancellation reduces the interference of the channel-feedback signal on the uplink-traffic signal.

In yet other aspects, methods are provided for scaling and shifting the channel feedback signal in frequency domain. This provides the flexibility in channel feedback when the downlink channel and uplink channel have different bandwidths, and when it is desired to use only part of the uplink-channel bandwidth for channel feedback.

In still other aspects, methods are provided for providing frequency diversity in channel feedback. The channel-feedback signal received by a base station comes through the uplink channel. If there are deep fades at certain frequencies in the uplink channel, it will be difficult to recover the downlink-channel information at those frequencies. Frequency diversity can significantly reduce the probability of loss of the downlink-channel information due to deep fades in the uplink channel.

Accordingly several advantages are to provide means of feasible and efficient channel feedback, to reduce the feedback overhead, and to improve accuracy and reliability in channel feedback. Still further advantages and novel features will become apparent from a study of the following description and the accompanying drawings.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

Various terms are used to describe the communications counterparts between which the channel feedback takes place. In the examples from wireless cellular networks, "base station" and "mobile user" are used to refer to the communications counterparts. In more general descriptions, more generic terms are defined as follows to describe the communications counterparts and respective channels. For any two communications devices that are communicating to each other in a communications network, the transmit channel and receive channel of one device is the receive channel and the transmit channel of the other device, respectively. When one devie need to acquire the information on its transmit channel via the feedback from the other device, that device is referred to as "channel-acquiring" device, and the other device is referred to as the "channel-feedback" device. The transmit channel of the channel-acquiring device, or the channel from the channel-acquiring device to the channel-feedback device, is referred to as the "forward" channel. The transmit channel of the channel-feedback device, or the channel from the channel-feedback device to the channel-acquiring device, is referred to as "reverse" channel. While it is possible that both devices may acquire their perspective transmit channels, and consequently, a device can be both channel-acquiring and channel-feedback and a channel both forward and reverse, it is sufficient to use a pair of channel-acquiring and channel-feedback devices and a pair of forward and reverse channels to describe and define the principles and the scope of the subject disclosure. In the realm of wireless cellular networks, when a base station attempts to acquire the downlink-channel information and requires downlink-channel feedback from a mobile user, the base station then corresponds to the channel-acquiring device, the mobile user to the channel-feedback device, the downlink channel to the forward channel, and the uplink channel to the reverse channel. If the mobile user attempts to acquire the uplink-channel information and requires uplink-channel feedback from the base station, the mobile user then corresponds to the channel-acquiring device, the base station to the channel-feedback device, the uplink channel to the forward channel, and the downlink channel to the reverse channel.

Figure 2:
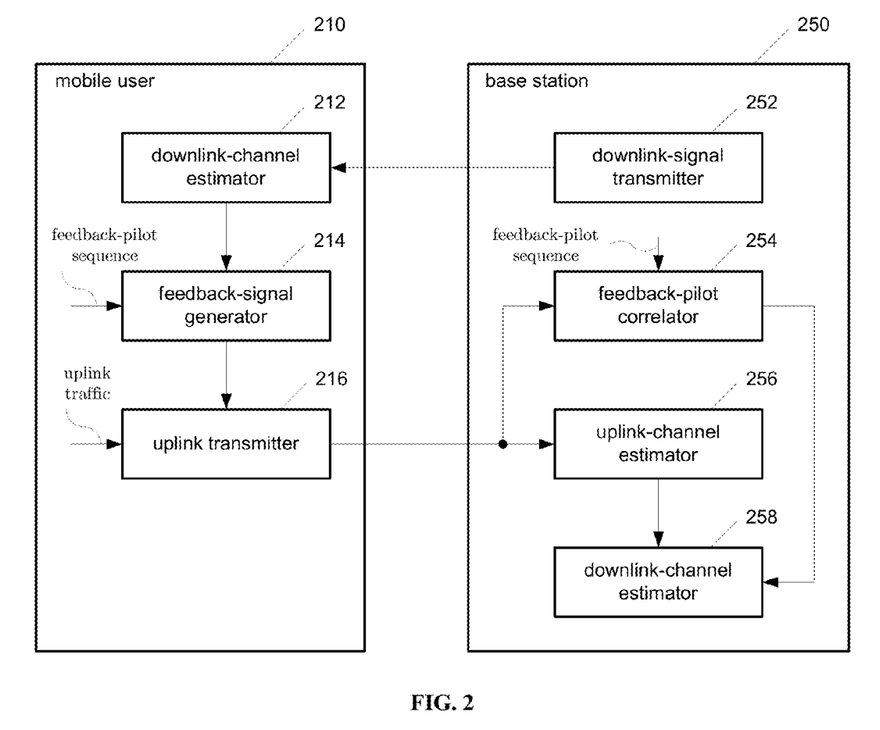
FIG. 2 illustrates a diagram of an exemplary basic scheme for channel feedback from a mobile user to a base station in a wireless cellular network.

FIG. 2 illustrates a diagram of an exemplary basic scheme for channel feedback from a mobile user to a base station in a wireless cellular network. Mobile user 210 comprises downlink-channel estimator 212, feedback-signal generator 214, and uplink transmitter 216. Base station 250 comprises downlink-signal transmitter 252, feedback-pilot correlator 254, uplink-channel estimator 256, and downlink-channel estimator 258. Downlink-signal transmitter 252 of base station 250 transmits the downlink signal to mobile user 210. Downlink-channel estimator 212 of mobile user 210 performs the downlink-channel estimation from the received downlink signal. The downlink channel is characterized by its impulse response $h_{dl}(n)$, where n takes integral values for discrete channel impulse response. The output of downlink-channel estimator 212 is the estimate of $h_{dl}(n)$. Ignoring the estimation noise for the purpose of illustration, $h_{dl}(n)$ is the same as its estimate. Feedback-signal generator 214 convolves a feedback-pilot sequence p(n) assigned to mobile user 210 for channel feedback with a feedback-information sequence f(n). The feedback-information sequence conveys the downlink-channel information. One choice for the feedback-information sequence is the downlink-channel impulse response $h_{dl}(n)$, i.e., $f(n)=h_{dl}(n)$. The output c(n) of feedback-signal generator 214 can then be written as $$c(n)=f(n)*p(n)=h_{dl}(n)*p(n)=(h_{dl}*p)(n) \quad (1)$$

c(n) is referred to as the channel-feedback signal. Referring to CDMA terminology, each term in the feedback-pilot sequence p(n), and consequently in the feedback-information sequence f(n) and in the channel-feedback signal c(n), is referred to as a chip, since p(n) plays the same role as a scrambling sequence in CDMA for discriminating channel-feedback signals.

Uplink transmitter 216 combines the channel-feedback signal c(n) and the uplink-traffic signal u(n) carrying regular uplink data to generate the combined uplink signal. Note that the chip rate of the channel-feedback signal c(n) and the sample rate of the uplink-traffic signal u(n) may not be the same. If this is the case, uplink transmitter 216 will perform rate conversion first so that the channel-feedback signal and the uplink-traffic signal can be combined on the same time base. Rate-conversion algorithms are well taught and understood in the areas of digital signal processing. Uplink transmitter 216 then sends the combined uplink signal to base station 250. In more generic terms, the uplink-traffic signal and the combined uplink signal in FIG. 2 correspond to reverse-channel-traffic signal and combined reserve-channel signal, respectively.

At base station 250, feedback-pilot correlator 254 correlates the received combined uplink signal with the same feedback-pilot sequence p(n) to yield the pilot-correlation output.

The expected values of the pilot-correlation output are proportional to $(h_{ul}*h_{dl})(n)$. Uplink-channel estimator 256 estimates the uplink channel $h_{ul}(n)$ from the regular uplink signal in the received combined uplink signal. Downlink-channel estimator 258 estimates the downlink channel from estimates of $(h_{ul}*h_{dl})(n)$ and $h_{ul}(n)$.

Methods exist for estimating $h_{dl}(n)$ from estimates of $(h_{ul}*h_{dl})(n)$ and $h_{ul}(n)$, including zero-forcing (ZF) and minimum mean-square error (MMSE) in time domain or in frequency domain.

The channel feedback scheme in FIG. 2 is referred to as wideband analog channel feedback. In traditional schemes, the mobile user encodes the channel information in data form, and sends the encoded data back to the base station. The base station decodes the received encoded data and recovers the downlink channel information. In contrast, the wideband analog channel feedback encodes the channel information in analog waveforms. The channel-feedback signal is wideband in the sense that the feedback waveform represented in Eq. (1) comprises the full downlink-channel information over the entire bandwidth of the downlink channel.

It should be noted that the downlink-channel impulse response $h_{dl}(n)$ may be estimated directly in certain RATs, such as CDMA. In other RATs such as OFDM, its frequency spectrum $H_{dl}(\omega)$ may be estimated first via the properly spaced pilot subcarriers, from which $h_{dl}(n)$ can be derived.

It can be appreciated that the convolution operation on feedback-pilot sequence p(n) and feedback-information sequence f(n) in feedback-signal generator 214 can be equivalently described by frequency-domain multiplications of their respective spectra $P(\omega)$ and $F(\omega)$. Thus the description by time-domain convolution herein should not be considered to be limited to the time-domain implementation. The underlying implementation can be either in time-domain or in frequency-domain or in the combination thereof, even though the description may be made in only one domain.

Many criteria can be used to construct the feedback-pilot sequence. One criterion is to require the feedback-pilot sequence to have a good auto-correlation property, i.e., the amplitudes of auto-correlation values should be as low as possible, statistically and/or deterministically, except at correlation lag of zero. Pseudo-random noise (PN) sequences often exhibit the good correlation property and can be used for constructing the feedback-pilot sequence. A PN sequence can be real-valued, complex-valued, binary-valued, etc.

In multipoint broadcasting and MIMO applications, a mobile needs to feedback more than one downlink channel via the uplink channel. Each channel-feedback signal needs to be uniquely identified with a distinct feedback-pilot sequence. It is desirable that the feedback-pilot sequences for channel-feedback signals possess a good cross-correlation property, i.e., the amplitudes of cross-correlation values of any two feedback-pilot sequences should be as low as possible, statistically and/or deterministically. Note that a feedback-pilot sequence can also be "shared" by more than one mobile user, if the distances between the sharing mobile users are sufficiently large so that the interference on one mobile user from the other mobile users is negligible.

Alternatively, a family of orthogonal sequences can be used for feedback-pilot sequences. One example of orthogonal sequences is the scrambling/spreading sequences used in a CDMA network, each scrambling/spreading sequence representing a code channel. The cross-correlation value of any two scrambling/spreading sequences with the accumulation length the same as the spreading factor is always zero.

It is to be understood that besides the downlink-channel impulse response $h_{dl}(n)$, other choices exist for the feedback-information sequence f(n). An example is described as follows. Assuming that the mobile user has the knowledge of the uplink-channel impulse response $h_{ul}(n)$ which for example can be obtained by the feedback from the base station, the feedback-information sequence can be chosen to be $$f(n)=(h_{ul-inv}*h_{dl})(n) \quad (2)$$

where $h_{ul\text{-}inv}(n)$ is the inverse of the uplink channel $h_{ul}(n)$ in the sense of, e.g., ZF or MMSE. For example, if ZF-inverse is used, then the concatenation of $h_{ul}(n)$ and $h_{ul\text{-}inv}(n)$ results in the impulse channel:

$$\delta(n)=(h_{ul}*h_{ul\text{-}inv})(n) \tag{3}$$

With the feedback-information sequence f(n) defined by Eqs. (2) and (3), the channel-feedback signal received at the base station is $$(h_{ul}*f*p)(n)=(h_{ul}*h_{ul\text{-}inv}*h_{dl}*p)(n)=(h_{dl}*p)(n) \tag{4}$$

Thus the base station can obtain the downlink-channel impulse response $h_{dl}(n)$ by simple channel estimation techniques without resorting to additional effort to recover $h_{dl}(n)$ from estimates of $(h_{ul}*h_{dl})(n)$ and $h_{ul}(n)$ as described before.

Figure 3:
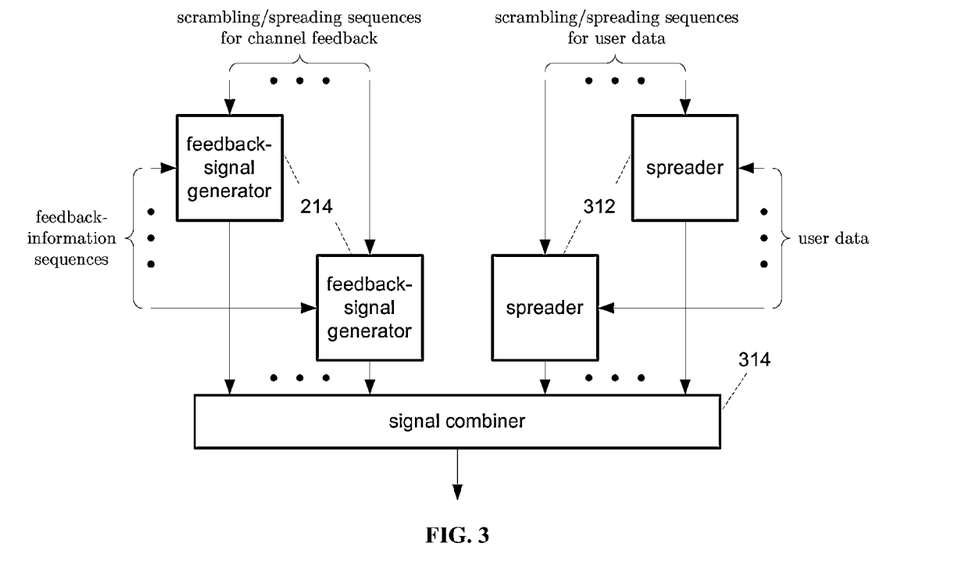
FIG. 3 illustrates an example system that makes the channel-feedback signal a part of the CDMA signal.

In accordance with some aspects, the channel-feedback signal c(n) can be made to be either a part, or independent, of the RAT of the wireless cellular network. For a CDMA network, the channel-feedback signal can be made to be a part of the CDMA signal. FIG. 3 illustrates an example system that makes the channel-feedback signal a part of the CDMA signal. In FIG. 3, the scrambling/spreading sequences are divided into two groups. The scrambling/spreading sequences in one group play the role of the feedback-pilot sequences, each channel-feedback signal being associated to one scrambling/spreading sequence. The other group is used for spreading the control and user data to generate the uplink-traffic signal.

Feedback-signal generators 214 in FIG. 3 convolve each scrambling/spreading sequence for channel feedback with its corresponding feedback-information sequence. Spreaders 312 spread the user data with the associated scrambling/spreading sequence. Signal combiner 314 combines the outputs of feedback-signal generators 214 and spreaders 312. The output of signal combiner 314, the combined uplink signal, is the weighted sum of its inputs. The weights can be pre-determined based on the power allocations for each channel feedback signal and each code channels of the uplink-traffic signal. It should be noted that while the channel-feedback signal and the uplink-traffic signal share the same family of scrambling/spreading sequence, the orthogonality between the two signals may not hold if there are multipaths in downlink channels, therefore the uplink-traffic signal may be subjected to additional interference from the channel-feedback signal. As will be disclosed later in this application, the interferences from the channel-feedback signal can be largely eliminated.

Figure 4:
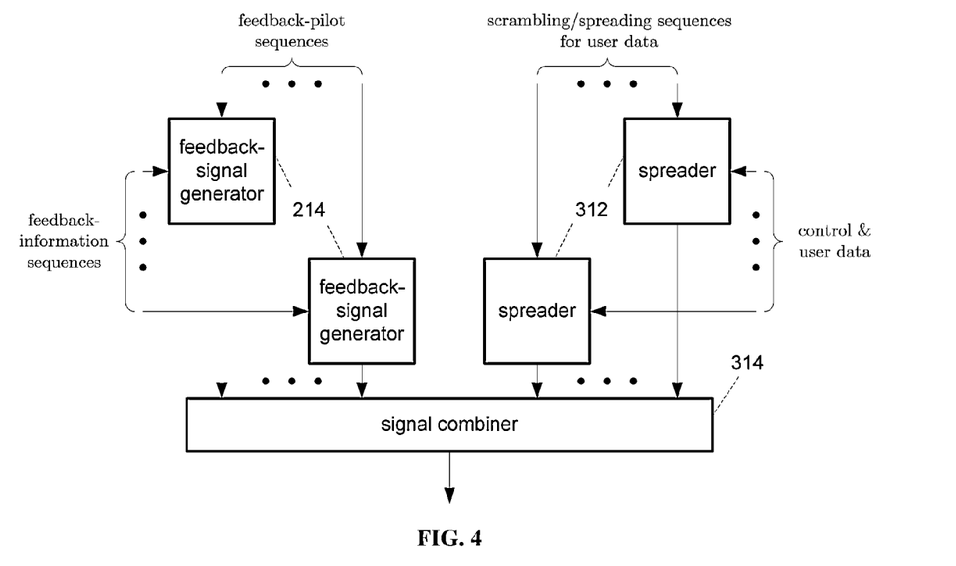
FIG. 4 illustrates an example system that generates the channel-feedback signal independently of the CDMA uplink-traffic signal.

The channel-feedback signal in a CDMA network can also be constructed in such a way that they are independent of the uplink-traffic signal. FIG. 4 illustrates an example system that generates the channel-feedback signal independently of the CDMA uplink-traffic signal. In FIG. 4, all the code channels, thus all the scrambling/spreading sequences, are allocated to carry the user data. The feedback-pilot sequences for generating the channel-feedback signal are not from the same family of the scrambling/spreading sequences for user data. Note that if in FIG. 4 the channel-feedback signal and the uplink-traffic signal have different chip rate, signal combiner 314 will perform rate conversion first so that the channel-feedback signal and the uplink-traffic signal can be combined on the same time base. The rest of the example system in FIG. 4 operates in the same manner as its counterpart in FIG. 3.

Figure 5:
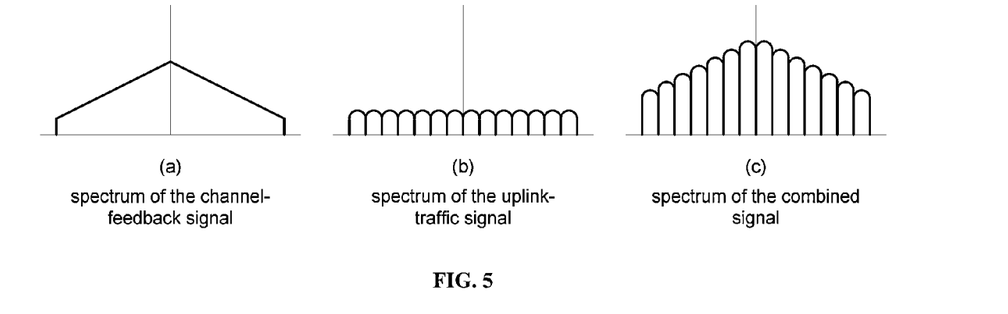
FIG. 5 illustrates an example combination of channel-feedback signal and uplink-traffic signal in an OFDM network.

For an RAT other than CDMA, the channel-feedback signal can be generally made to be independent of the RAT in the sense that the channel-feedback signal is not considered to be part of signals of the RAT, i.e., the channel-feedback signal does not have the same signal structure of the RAT signals. FIG. 5 illustrates an example combination of channel-feedback signal and uplink-traffic signal in an OFDM network. It can be seen from FIG. 5 that the spectra of the channel-feedback signal and the OFDM uplink-traffic signal are very different.

An advantage of the wideband analog channel feedback can be appreciated from above descriptions: it uses very little or no resources of the RAT in a wireless cellular network. The resources of an RAT refer to the basic units for user or data-stream allocation. For example, the resources in a CDMA network are the code channels associated with scrambling/spreading sequence, and the resources in an OFDM network are the subcarriers. In a CDMA network where the feedback-pilot sequences are chosen from the scrambling/spreading sequences, very few feedback-pilot sequences are needed even with MIMO configurations out of hundreds of available scrambling/spreading sequences. If the channel-feedback signal is made independent of the RAT of a wireless cellular network, it takes no resources away from the RAT, as is the case in an OFDM network. Therefore, while there is transmit-power overhead for channel feedback, there is very small or zero resource overhead, a sharp contrast to the traditional approach to channel feedback that uses a significant portion of, or even all of, the available resources of the RAT.

Figure 6:
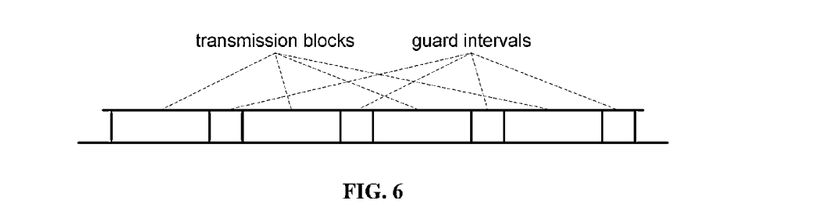
FIG. 6 illustrates an example block transmission structure.

The channel-feedback signals can be also made to be in sync with or asynchronous to the timing structures of an RAT. For example, some RATs such as OFDM employ the block transmission structure in time domain, and guard intervals are inserted between adjacent transmission blocks. FIG. 6 illustrates an example block transmission structure. The signals are divided into blocks and are transmitted in blocks. The guard interval between two transmission blocks can be cyclic-prefix (CP) or zero-padded (ZP), which facilitates the signal reception and channel estimation at the receiver in the presence of multipaths. The channel-feedback signal can adopt the same block transmission structure in time domain, with CP or ZP guard intervals between adjacent transmission blocks. Another option is that the channel-feedback signal is made to be continuous without a block structure. Yet a third option is that the channel-feedback signal adopts its own block structure that is different from and/or asynchronous to the block structure of the RAT signals.

Figure 7:
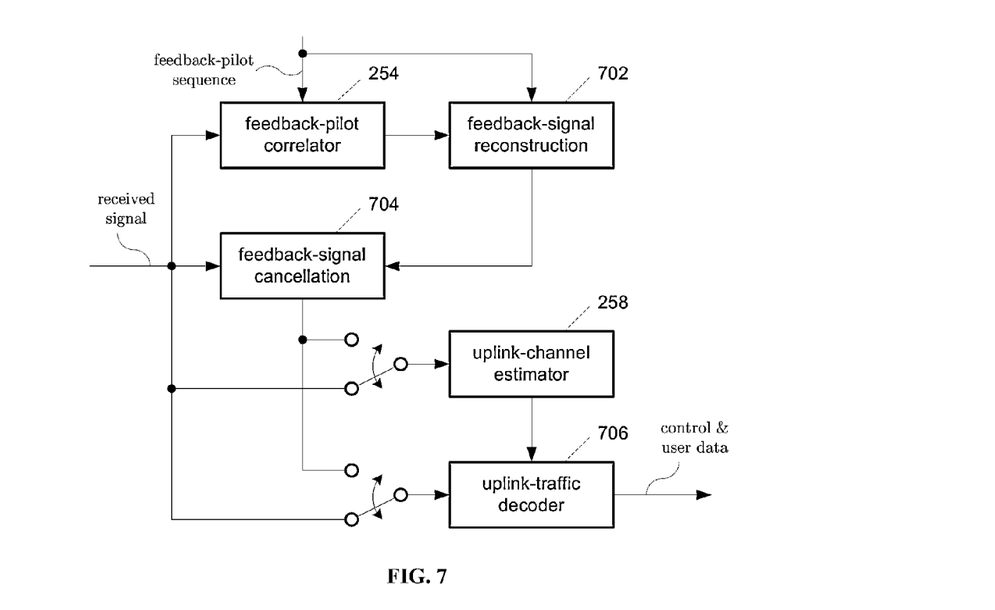
FIG. 7 illustrates an example scheme for channel-feedback signal cancellation.

In accordance with some other aspects, the channel-feedback signal can be cancelled at the reception so that its interference to the uplink-traffic signal is reduced or minimized. FIG. 7 illustrates an example scheme for channel-feedback signal cancellation. The received signal at the base station consists of the channel-feedback signal and the uplink-traffic signal. For the purpose of illustration, single channel-feedback signal is assumed. It is also assumed that the downlink-channel impulse response $h_{dl}(n)$ is used as the feedback-information sequence to generate the channel-feedback signal. It can be appreciated that the principles of the channel-feedback signal cancellation described below apply to multiple channel-feedback signals and to other suitable choices for the feedback-information sequence as well.

In FIG. 7, feedback-pilot correlator 254 correlates the received signal with the feedback-pilot sequence p(n). As described previously, the output values of feedback-pilot correlator 254 are proportional to $(h_{ul}*h_{dl})(n)$ Feedback-signal reconstruction apparatus 702 reconstructs the received channel-feedback signal $c_r(n)$:

$$c_r(n)=(h_{ul}*h_{dl}*p)(n) \tag{5}$$

Feedback-signal cancellation apparatus 704 subtracts the reconstructed channel-feedback signal given in Eq. (5) from the received signal. Uplink-channel estimator 258 estimates the uplink channel from the received signal. Alternatively, uplink-channel estimator 258 can also estimate the uplink channel from the output of feedback-signal cancellation apparatus 704, where much of the interference of the channel-feedback signal is removed. Uplink-traffic decoder 706 decodes the control and user data in uplink from the received signal, with the help of the estimated uplink channel from uplink-channel estimator 258. This corresponds to no channel-feedback signal cancellation. Alternatively, uplink-traffic decoder 706 can decode the control and user data in uplink from the output of feedback-signal cancellation apparatus 704.

Figure 8:
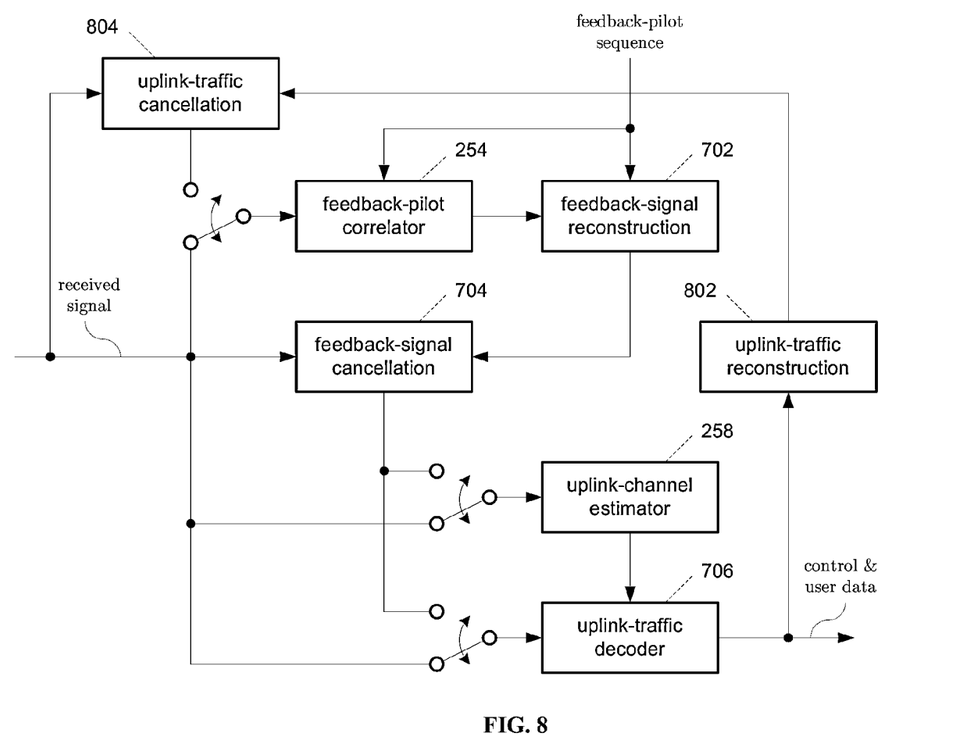
FIG. 8 illustrates an example iterative scheme for channel-feedback signal cancellation.

The cancellation scheme in FIG. 7 can also be used as a basis for iterative cancellation. FIG. 8 illustrates an example iterative scheme for channel-feedback signal cancellation. In FIG. 8, uplink-traffic reconstruction apparatus 802 reconstructs the uplink-traffic signal from the output of uplink-traffic decoder 706. Uplink-traffic cancellation apparatus 804 subtracts the reconstructed uplink-traffic signal from the received signal. Then feedback-pilot correlator 254 can redo the correlation between the pilot sequence p(n) and the output of uplink-traffic cancellation apparatus 804. If the removal of the uplink-traffic signal by uplink-traffic cancellation apparatus 804 is successful, the output of feedback-pilot correlator 254 will be less noisy, and the reconstructed channel-feedback signal from feedback-signal reconstruction apparatus 702 will have higher fidelity, which in turn helps improve the performance of uplink-traffic decoder 706. The output of feed-back-pilot correlator 254, together with uplink-traffic cancellation, can also be used for downlink-channel estimation. The iteration process can be repeated several times if needed.

It is to be understood that while the channel-feedback signal cancellation scheme described above uses single mobile user for illustrative purposes, the scheme applies to multiple mobile users sending their respective channel-feedback signals to respective base stations. A base station, when receiving uplink signals with channel feedback from multiple mobile users, can employ the channel-feedback signal cancellation scheme to remove the channel-feedback signals from multiple mobile users prior to decoding the uplink traffic.

Figure 9:
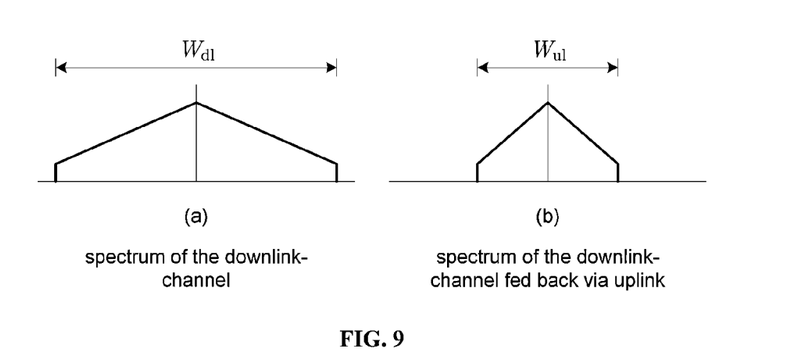
FIG. 9 illustrates frequency scaling of an example downlink-channel spectrum.

In accordance with some further aspects, the channel-feedback signal can be scaled, shifted, split, and blocked in frequency domain. It should be noted that the channel-feedback scheme described above does not require that the downlink and uplink channel have equal bandwidth since the channel information to be fed back is in discrete domain, as given in Eq. (1). This is can be seen from the following example. Assume that the feedback-information sequence is $h_{dl}(n)$. $h_{dl}(n)$ is associated with both the downlink channel bandwidth $W_{dl}$ and uplink channel bandwidth $W_{ul}$. When $h_{dl}(n)$ is estimated from the downlink signal, the corresponding chip rate is $W_{dl}$. Note that in general the chip date is $\alpha W_{dl}$, and $\alpha=1$ only when the frequency band roll-over and guard band are ignored. While $\alpha=1$ is used hereinafter for both downlink and uplink for illustration purposes, the scope of the subject disclosure is not limited to $\alpha=1$. When $h_{dl}(n)$ is transmitted to the base station, the corresponding chip rate is $W_{ul}$. Since the downlink-channel information is completely represented in $h_{dl}(n)$, the change in bandwidth, hence in the chip rate, does not alter the downlink-channel information. In frequency domain, the change in bandwidth corresponds to the frequency scaling of the spectrum. FIG. 9 illustrates frequency scaling of an example downlink-channel spectrum.

Figure 10:
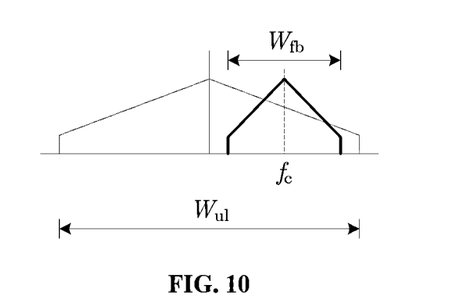
FIG. 10 illustrates an example of channel-feedback signal re-positioning.

In some applications it may be desired that only a part of the uplink bandwidth is used for channel feedback. For example, an OFDM system may allocate some subcarriers to carry critical information, thus interferences on those subcarriers are to be kept as low as possible, and it is desirable that the channel-feedback signal avoid those subcarriers. This requires re-positioning of the channel-feedback signal with a bandwidth smaller than the uplink bandwidth. The repositioning of the channel-feedback signal can be performed in the discrete domain. FIG. 10 illustrates an example of channel-feedback signal re-positioning. Instead of using the entire uplink bandwidth $W_{ul}$ to feedback the downlink channel, whose spectrum is plotted in dotted line in FIG. 10, the frequency band for channel feedback has a bandwidth $W_{fb}<W_{ul}$ and a center frequency $f_c$.

Figure 11:
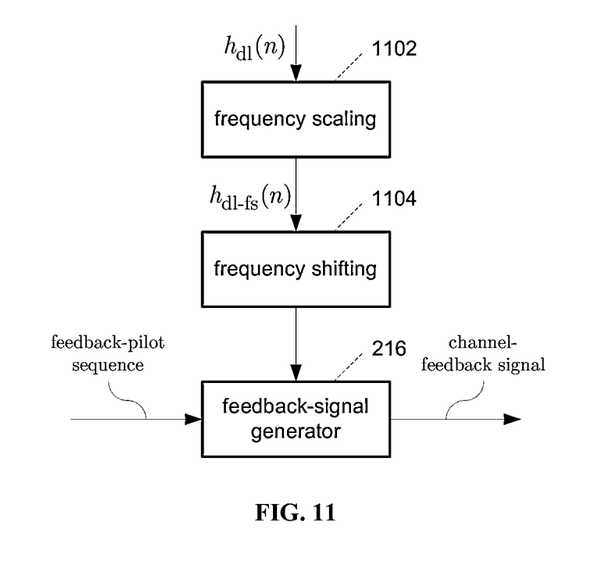
FIG. 11 illustrates an example procedure for channel-feedback signal re-positioning in discrete domain.

FIG. 11 illustrates an example procedure for channel-feedback signal re-positioning in discrete domain. In FIG. 11, frequency scaling apparatus 1102 performs frequency scaling on the downlink-channel impulse response $h_{dl}(n)$. The frequency scaling changes the bandwidth of $h_{dl}(n)$ from $W_{ul}$ to $W_{fb}$. Note that quantity $W_{dl}$ is not relevant, since only the uplink channel is of interest here. The output $h_{dl\text{-}fs}(n)$ of frequency scaling apparatus 1102 is a rate-converted version of $h_{dl}(n)$, that is, if the continuous downlink-channel impulse response is $h_{dl,\,cont}(t)$ and $h_{dl}(n)$ is the discrete version of $h_{dl,\,cont}(t)$ with sampling interval T :

$$h_{dl}(n)=h_{dl,\,cont}(nT) \quad (6)$$

then $h_{dl\text{-}fs}(n)$ samples the same $h_{dl,\,cont}(t)$ with sampling interval reduced from T to $TW_{fb}/W_{ul}$:

$$h_{dl\text{-}fs}(n)=h_{dl,\,cont}(nTW_{fb}/W_{ul}) \quad (7)$$

If T satisfies the sampling theorem, $h_{dl}(n)$ contains all information about $h_{dl,\,cont}(t)$.

Then there is no need to resample $_{dl,cont}(t)$ with sampling interval $TW_{fb}/W_{ul}$ to obtain $h_{dl\text{-}fs}(n)$. Frequency scaling apparatus 1102 can simply obtain $h_{dl\text{-}fs}(n)$ from $h_{dl}(n)$ using a rate-conversion algorithm.

From the descriptions above, it can be seen that an uplink channel bandwidth differing from the downlink channel bandwidth automatically induces the frequency scaling on the channel-feedback signal. To further frequency-scale the channel-feedback signal within the uplink channel bandwidth, however, requires additional effort such as the rate conversion.

Frequency shifting apparatus 1104 in FIG. 11 shifts the center frequency of $h_{dl\text{-}fs}(n)$ to $f_c$ by multiplying $h_{dl\text{-}fs}(n)$ with $\exp(2\pi n f_c/W_{ul})$. Feedback-signal generator 214 convolves the feedback-pilot sequence p(n) with the output of frequency shifting apparatus 1104, $h_{dl\text{-}fs}(n)\exp(2\pi n f_c/W_{ul})$.

It should be appreciated that while the downlink-channel impulse response $h_{dl}(n)$ is used to generate the feedback-information sequence in FIG. 11, the principles described in the example procedure for re-positioning the channel-feedback signal apply to other choices for the feedback-information sequence.

Figure 12:
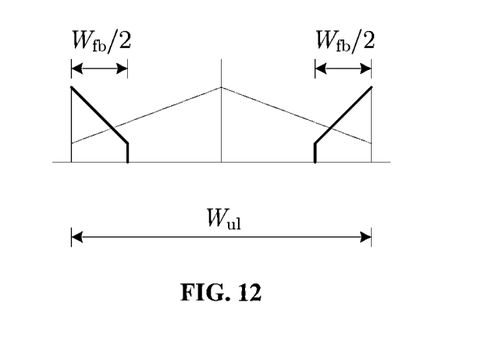
FIG. 12 illustrates an example of spectrum wrap-around of the channel-feedback signal due to frequency shifting.

It can be appreciated that when the center frequency $f_c$ takes certain values, the resulting spectrum of the channel-feedback signal will wrap around. FIG. 12 illustrates an example of spectrum wrap-around of the channel-feedback signal with $f_c=W_{ul}/2$. It can be seen from FIG. 12 that the spectrum wraps around within the bandwidth of $W_{ul}$ when the amount of frequency shifting pushes part of the spectrum out at one end of the frequency band, which reenters from the other end of the frequency band.

Figure 13:
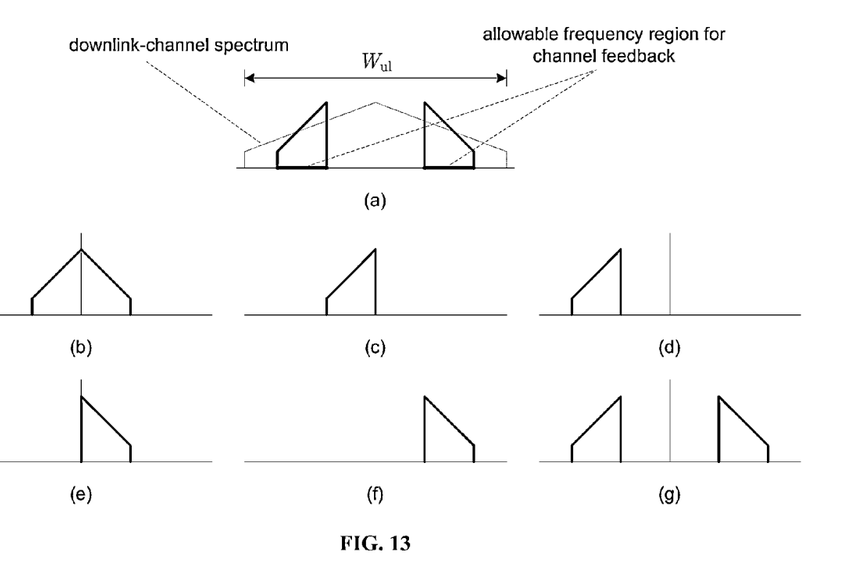
FIG. 13 illustrates an example allowed frequency region for channel feedback and an example procedure for splitting the spectrum of the feedback-information sequence.

If the allowable frequency region for channel feedback is not contiguous, the spectrum of the downlink-channel, or more generally, the spectrum of the feedback-information sequence, need to be split into several parts in frequency domain accordingly. FIG. 13 illustrates an example allowed frequency region for channel feedback and an example procedure for splitting the spectrum of the feedback-information sequence so that the channel-feedback signal fits the allowable frequency region. The example allowed frequency region is shown in FIG. 13(a), which has two disjoint frequency bands. The example procedure for frequency splitting is shown in FIG. 13(b) through (g). FIG. 13(b) shows a frequency-scaling operation that scales the feedback-information sequence spectrum to the desired bandwidth. FIG. 13(c) shows a filtering operation that retains the left half of the feedback-information sequence spectrum. FIG. 13(d) shows a frequency-shift operation that shifts the left half of feedback-information sequence spectrum to one of the two allowed frequency bands. FIG. 13(e) shows another filtering operation that retains the right half of the feedback-information sequence spectrum. FIG. 13(f) shows another frequency-shift operation that shifts the right half of the feedback-information sequence spectrum to the other allowed frequency band. FIG. 13(g) shows a combining operation that combines the frequency-shifted left and right parts of the feedback-information sequence spectrum. The spectrum shown in FIG. 13(g) corresponds to the spectrum of the channel-feedback signal that will be sent to the base station using the allowed frequency region.

It can be appreciated that a different order of operations than the one suggested in FIG. 13(b) through (g) can also be used. For example, filtering can be performed before the frequency scaling. It can also be appreciated that a channel-feedback signal can be made, in the manner described above, to fit into an allowable frequency region with more than two disjoint frequency bands.

There can be situations where only certain part of the downlink channel is used in a multipoint-broadcast session. For example, in an OFDM network, a subset of subcarriers may be allocated for a multipoint-broadcast session. In such cases, the base stations are only interested in the downlink-channel information on those subcarriers for multipoint broadcasting, and it is not necessary for a mobile user to send the downlink-channel information over the entire bandwidth. If the channel-feedback signal contains only the downlink-channel information on those multipoint-broadcast subcarriers and blocks the downlink-channel information on the non-multipoint-broadcast subcarriers, the interference of the channel-feedback signal on the uplink-traffic signal can be reduced, and so can the transmit power of the mobile user.

Figure 14:
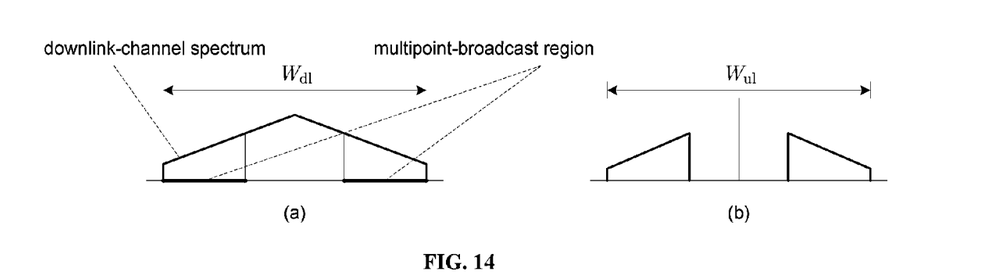
FIG. 14 illustrates an example frequency allocation for multipoint broadcasting in the downlink channel, and an example frequency blocking in the channel-feedback signal.

FIG. 14 illustrates an example frequency allocation for multipoint broadcasting in the downlink channel, and an example frequency blocking in the channel-feedback signal. FIG. 14(a) shows a multipoint-broadcast region within the downlink-channel bandwidth. FIG. 14(b) shows the spectrum of channel-feedback signal after frequency blocking. One way to accomplish the frequency blocking is to pass the pre-blocking channel-feedback signal through a filter that blocks the signal component in the non-multipoint-broadcast region. It can be appreciated that other manipulations in frequency domain described above, i.e., frequency scaling, shifting, and splitting, may also be used in combination of frequency blocking to make the channel-feedback signal fit into the allowable frequency region for channel feedback.

In accordance with some more aspects, frequency diversity can be employed in the down-link-channel feedback to combat the deep fading in the uplink channel and to improve the feedback quality. The negative impact of the deep fading in the uplink channel on the quality of channel feedback can be illustrated as follows. Assume that the downlink-channel impulse response $h_{dl}(n)$ is used as the feedback-information sequence to generate the channel-feedback signal. What the base station can detect are $(h_{ul}*h_{dl})(n)$ from the channel-feedback signal, and $h_{ul}(n)$ from the uplink-traffic signal. Therefore $h_{dl}(n)$ has to be derived from $(h_{ul}*h_{dl})(n)$ and $h_{ul}(n)$, or equivalently, $H_{dl}(\omega)$ has to be derived from $H_{ul}(\omega)H_{dl}(\omega)$ and $H_{ul}(\omega)$. Now it can be clearly seen that $H_{ul}(\omega)$ directly affects the detection quality for $H_{dl}(\omega)$: if at the frequencies where the amplitude of $H_{ul}(\omega)$ is low, the amplitude of $H_{ul}(\omega)H_{dl}(\omega)$ can be also low relative to the estimation noise, and so will be the detection quality of $^H_{dl}(\omega)$.

Figure 15:
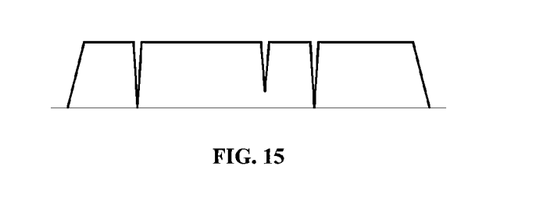
FIG. 15 illustrates an example wireless channel that has deep fades within its bandwidth.
Figure 16:
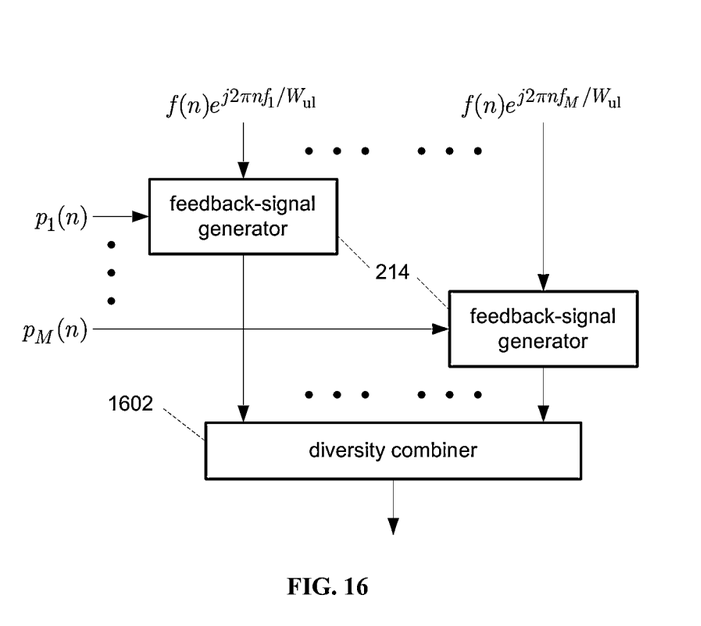
FIG. 16 illustrates an example implementation of shift-and-overlapping frequency diversity for channel feedback.

A wideband wireless channel often exhibits deep fades at random frequencies. FIG. 15 illustrates an example wireless channel that has deep fades within its bandwidth. Frequency diversity can be achieved by transmitting different versions of the channel-feedback signal simultaneously. One approach to providing the frequency diversity, referred to as shift-and-overlap, is described with reference to FIG. 16, where an example implementation of shift-and-overlap frequency diversity for channel feedback is illustrated. In FIG. 16, there are M frequency-shifted versions of the feedback-information sequence f(n) with a set of predetermined frequencies $f_1, \ldots, f_M$, and M feedback-pilot sequences $p_1(n), \ldots, p_M(n)$. Feedback-signal generator 214 convolves feedback-pilot sequence $p_m(n)$ with frequency- $f_m$-shifted feedback-information sequence for m=1, . . . , M. Diversity combiner 1602 combines all M outputs of feedback-signal generator 214 to form the shift-and-overlap channel-feedback signal. If all M feedback-pilot sequences are statistically independent, and if $f(n)=h_{dl}(n)$, the base station will be able to detect M spectrums $H_{ul}(\omega)H_{dl}(\omega-2\pi f_1), \ldots, H_{ul}(\omega)H_{dl}(\omega-2\pi f_M)$. Equivalently, the M spectrums can be written as $H_{ul}(\omega+2\pi f_1)H_{dl}(\omega), \ldots, H_{ul}(\omega+2\pi f_M)H_{dl}(\omega)$. Thus the downlink-channel information at one frequency is conveyed by M products of itself with M uplink-channel values at M different frequencies. Since the deep-fading frequencies are random, the likelihood is high that at least some of the M uplink-channel values in the above M products will have reasonably high amplitudes so that $H_{dl}(\omega)$ can be detected with good accuracy.

Figure 17:
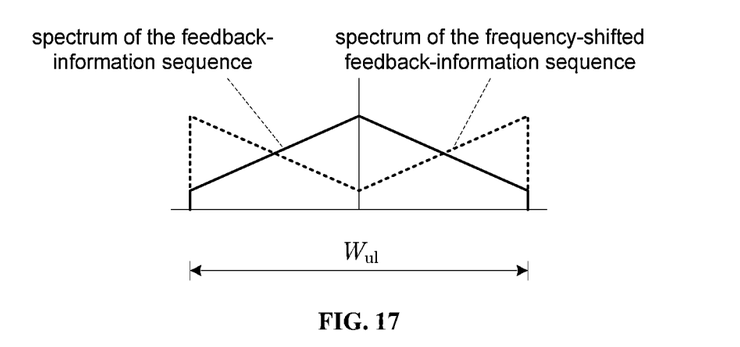
FIG. 17 illustrates the spectrum of an example shift-and-overlapping channel-feedback signal.

FIG. 17 illustrates the spectrum of an example shift-and-overlap channel-feedback signal with M=2 and $f_1=0$, $f_2=W_{ul}/2$.

Figure 18:
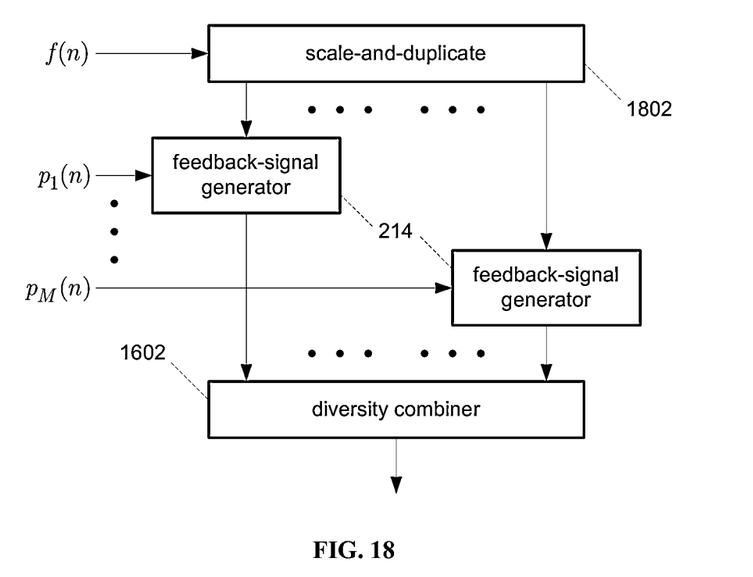
FIG. 18 illustrates an example implementation of scale-and-duplicate frequency diversity for channel feedback.
Figure 19:
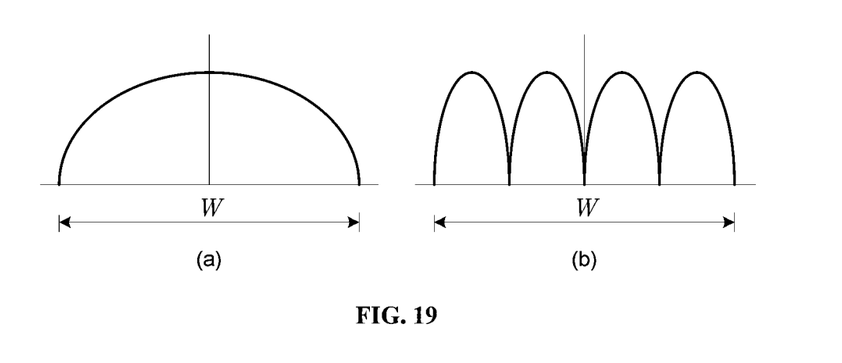
FIG. 19 illustrates the spectra of an example feedback-information sequence before and after scale-and-duplicate.

Another approach to providing the frequency diversity is referred to as scale-and-duplicate. FIG. 18 illustrates an example implementation of scale-and-duplicate frequency diversity for channel feedback. Scale-and-duplicate apparatus 1802 takes the feedback-information sequence f(n) of bandwidth W as input, generates M frequency-scaled-down versions of the feedback-information sequence, and re-positions those M sequences to fill in the bandwidth of the original feedback-information sequence by frequency-shifting. Feedback-signal generator 214 convolves feedback-pilot sequence $p_m(n)$ with the m- th frequency-scaled-down versions of the feedback-information sequence for m=1, . . . , M. Diversity combiner 1602 combines all M outputs of feedback-signal generator 214 to form the scale-and-duplicate channel-feedback signal. The effect of the scale-and-duplicate operation can be appreciated with reference to FIG. 19, where the spectra of an example feedback-information sequence is illustrated, before and after scale-and-duplicate. FIG. 19(a) shows the spectrum of the example feedback-information sequence before scale-and-duplicate. FIG. 19(b) shows an examplary spectrum of the example feedback-information sequence after scale-and-duplicate. It can be seen from FIG. 19 that the frequency diversity is achieved by duplicating each value of the spectrum of the feedback-information sequence M times and distributing them in M different frequency locations.

Figure 20:
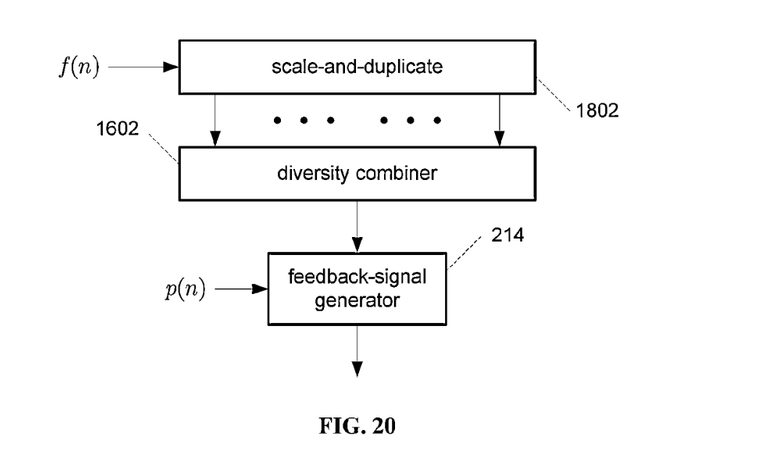
FIG. 20 illustrates an example implementation of scale-and-duplicate frequency diversity for channel feedback with a common feedback-pilot sequence.

It can be appreciated that since the M scaled-and-duplicated feedback-information sequences have disjoint spectra, it is not necessary for the M feedback-pilot sequences to be different in order to discriminate the scaled-and-duplicated feedback-information sequences. In other words, a common feedback-pilot sequence can be used in the scale-and-duplicate approach. When a common feedback-pilot sequence is used, the diversity combining can be performed first, followed by the channel-feedback signal generation. An example of such implementation is illustrated in FIG. 20.

Figure 21:
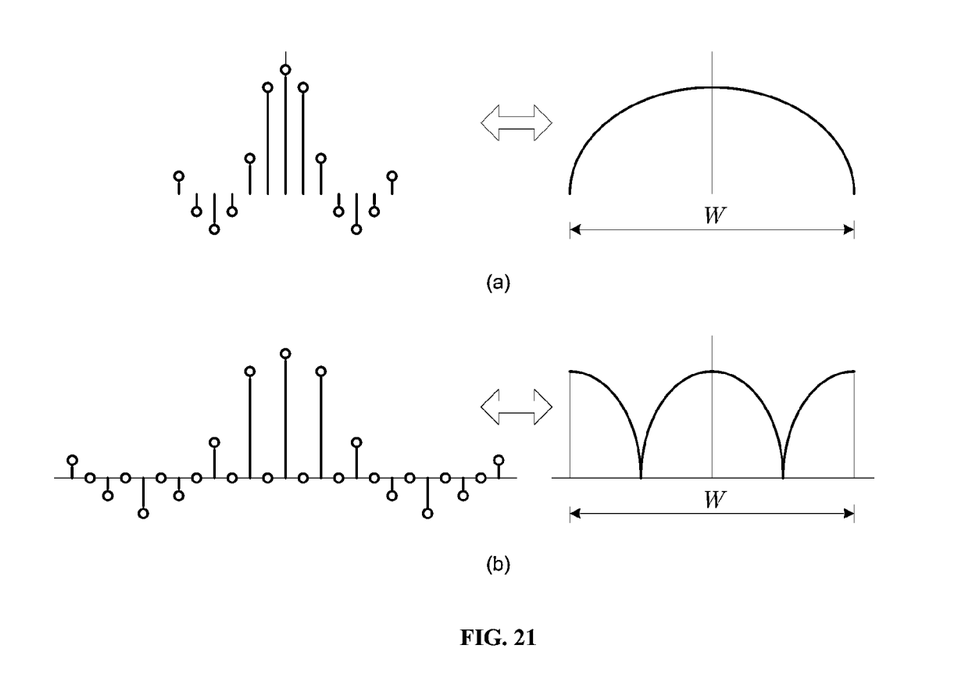
FIG. 21 illustrates an example of oversampling of a sequence.
Figure 22:
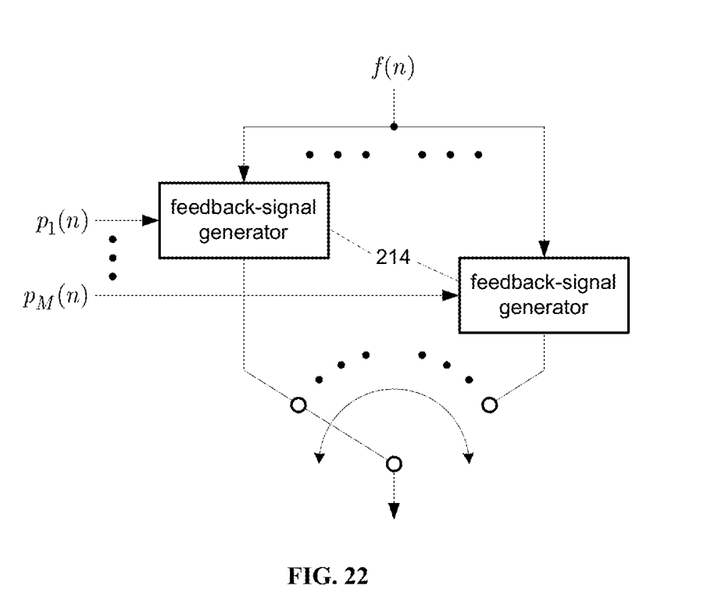
FIG. 22 illustrates an example implementation of the oversampling scheme for scale-and-duplicate frequency diversity.

If all M scaling factors for the feedback-information sequence are the same, and the M spectrum of scaled-and-duplicated feedback-information sequence uniformly occupy the bandwidth of the original feedback-information sequence, a simple oversampling scheme can be employe to generate the scale-and-duplicate frequency diversity. Recall that oversampling a sequence of a bandwidth W by inserting M−1 zeros between the terms of the sequence generates a new sequence whose spectrum is M disjoint copies of the spectrum of the original sequence scaled by 1/M within the bandwidth W, with one of the scaled spectrum centered at zero frequency. FIG. 21 illustrates an example of oversampling of a sequence with M=2. FIG. 21(a) shows the pair of the original sequence and its spectrum. FIG. 21(b) shows the pair of the oversampled-by-2 sequence and its spectrum. From FIG. 21 it can be seen that over-sampling the feedback-information sequence yields the desired spectrum of the scale-and duplicate frequency diversity. An example oversampling scheme is illustrated in FIG. 22. In FIG. 22, the feedback-pilot sequence p(n) is broken into M subsequences by decimation:

$$p_m(n)=p(nM+m-1), m=1,\ldots,M \quad (8)$$

Feedback-signal generator 214 convolves feedback-information sequence f(n) with each subsequence of p(n). The M outputs of feedback generator 214 are sequentially selected to form the scale-and-duplicate channel-feedback signal such that at time index nM+m−1, the scale-and-duplicate channel-feedback signal is given by $(f^*p_m)(n)$. The scale-and-duplicate channel-feedback signal can also be frequency-shifted if needed. For example, if it is desired that the interference of the channel-feedback signal to the uplink traffic is minimized at the center frequency, the frequency-shift can be applied so that a spectrum null of the scale-and-duplicate channel-feedback signal coincides with the center frequency.

Conclusion, Ramifications, and Scope

Accordingly it will be seen that the wideband analog channel feedback provides a feasible and efficient means for channel feedback. It uses very few or no resources of the RAT of the wireless cellular network, a sharp contrast to the traditional approach that uses a significant portion of, or even all of, the available resources of the RAT and thus significantly diminishes the network capacity.

The wideband analog channel feedback allows the channel-feedback signal to be cancelled at the base station so that its interference to the uplink-traffic signal is minimized, which further improves the network capacity.

The wideband analog channel feedback also has the flexibility to adapt the channel bandwidth so that the downlink-channel information can be fed back via the uplink channel to the base stations even when the uplink channel has a different bandwidth than the downlink channel, or when only certain part of the uplink channel is allowed for channel feedback. It also offers the flexibility of feeding back only certain part of the downlink channel that the base station is interested in, thus further reducing the channel-feedback interference.

The wideband analog channel feedback also has means to incorporate frequency diversity into the channel-feedback signal, thus making the channel feedback more reliable against the deep fading that is a dominant impairment in a wireless network.

While many specific details are described by the examples of downlink-channel feedback via the uplink channel, it is to be appreciated that claimed subject matter herein certainly applies to uplink-channel feedback via the downlink channel. It also applies to both the FDD and the TDD networks. In fact, it is to be appreciated that the claimed subject matter herein is not limited to wireless cellular networks. It is applicable to a broader type of channel feedback defined as feeding the forward-channel information back to a channel-acquiring device by a channel-feedback device via the reverse channel, with the channel-acquiring device and the channel-feedback device being part of a communications network.

Specific examples herein are used to describe methods, apparatus, schemes, and/or operations. It is to be appreciated and understood that the choice of time-domain or frequency-domain description for a specific example is for illustration purposes, not an indication of preference in implementations.

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for channel-information feedback in a communications network, having at least one channel-acquiring device, at least one channel-feedback device, at least one forward channel from said channel-acquiring device to channel-feedback device, and, at least one reverse channel from said channel feedback device to channel-acquiring device, comprising:
    (a) sending a forward-channel signal over said forward channel from said channel-acquiring device,
    (b) generating a first forward-channel estimate from said forward-channel signal at said channel-feedback device,
    (c) generating a feedback-information sequence that is a function of said first forward-channel estimate at said channel-feedback device,
    (d) generating a channel-feedback signal at said channel-feedback device by convolving said feedback-information sequence with a predetermined feedback-pilot sequence,
    (e) combining said channel-feedback signal with a reverse-channel traffic signal to form a combined reverse-channel signal at said channel-feedback device,
    (f) sending said combined reverse-channel signal over said reverse channel to said channel-acquiring device,
    (g) correlating said combined reverse-channel signal received at said channel-acquiring device with said feedback-pilot sequence to generate a pilot-correlation output,
    (h) generating a reverse-channel estimate from said combined reverse-channel signal received at said channel-acquiring device, and
    (i) generating a second forward-channel estimate at said channel-acquiring device from said pilot-correlation output and said reverse-channel estimate, whereby said channel-acquiring device acquires said second forward-channel estimate as the forward-channel estimate.

2. The method of claim 1, wherein said feedback-pilot sequence is a pseudo-random noise (PN) sequence.

3. The method of claim 1, wherein said feedback-pilot sequence is from a family of orthogonal sequences.

4. The method of claim 1, wherein said feedback-information sequence is said first forward-channel estimate, and said first forward-channel estimate is the estimate of the forward-channel impulse response sequence.

5. The method of claim 1, wherein said communications network is a wireless cellular network with a radio access technology (RAT).

6. The method of claim 5, wherein said RAT is code-division multiple access (CDMA), and said feedback-pilot sequence is a scrambling/spreading sequence of the CDMA.

7. The method of claim 5, wherein said channel-feedback signal is made to be independent of said RAT, whereby said channel-feedback signal uses no resources of said RAT.

8. The method of claim 5, wherein said channel-acquiring device is a base station, said channel-feedback device is a mobile user, said forward channel is a downlink channel, and said reverse channel is an uplink channel.

9. The method of claim 5, wherein said channel-acquiring device is a mobile user, said channel-feedback device is a base station, said forward channel is an uplink channel, and said reverse channel is a downlink channel.

10. The method of claim 1, wherein generating said second forward-channel estimate uses the method of zero-forcing (ZF) to generate said second forward-channel estimate from said pilot-correlation output and said reverse-channel estimate.

11. The method of claim 1, wherein generating said second forward-channel estimate uses the method of minimum mean-square error (MMSE) to generate said second forward-channel estimate from said pilot-correlation output and said reverse-channel estimate.

12. The method of claim 1, wherein said channel-acquiring device applies channel-feedback signal cancellation to decoding said reverse-channel traffic, further comprising:
   (a) generating a reconstructed channel-feedback signal with said pilot-correlation out-put and said feedback-pilot sequence, and
   (b) generating an updated reverse-channel traffic signal by subtracting said reconstructed channel-feedback signal from said combined reverse-channel signal received at said channel-acquiring device,
   whereby said channel-acquiring device uses said updated reverse-channel traffic for decoding.

13. The method of claim 12, wherein said channel-acquiring device applies said channel-feedback signal cancellation multiple times to cancel multiple channel-feedback signals.

14. The method of claim 12, wherein said channel-acquiring device applies said channel-feedback signal cancellation to cancel the channel-feedback signals from other channel-feedback devices to other channel-acquiring devices.

15. The method of claim 12, wherein said channel-acquiring device applies said channel-feedback signal cancellation iteratively, further comprising:
   (a) decoding said reverse-channel traffic,
   (b) generating a reconstructed reverse-channel traffic signal, and
   (c) generating an updated channel-feedback signal by subtracting said reconstructed reverse-channel traffic signal from said combined reverse-channel signal received at said channel-acquiring device,
   whereby said channel-acquiring device uses said updated channel-feedback signal for generating said reconstructed channel-feedback signal and said second forward-channel estimate.

16. The method of claim 1, wherein generating said channel-feedback signal further comprises frequency-scaling said channel-feedback signal to fit the bandwidth of said reverse channel if it is different from the bandwidth of said forward channel.

17. The method of claim 1, wherein generating said channel-feedback signal further comprises manipulating said channel-feedback signal to fit the allowable frequency region for channel feedback within said bandwidth of said reverse channel.

18. The method of claim 17, wherein manipulating said channel-feedback signal further comprises at least one of:
   (a) frequency-scaling,
   (b) frequency-shifting,
   (c) frequency-splitting,
   and any combination thereof.

19. The method of claim 1, wherein generating said channel-feedback signal further comprises frequency-blocking said channel-feedback signal so that said channel-feedback signal at certain blockable frequencies is not transmitted to said channel-acquiring device.

20. The method of claim 1, wherein generating said channel-feedback signal further comprises incorporating the frequency diversity into said channel-feedback signal.

21. The method of claim 20, wherein said frequency diversity is shift-and-overlap.

22. The method of claim 20, wherein said frequency diversity is scale-and-duplicate.

23. The method of claim 22, wherein said scale-and-duplicate frequency diversity is implemented by oversampling said feedback-information sequence.

24. The method of claim 22, wherein said scale-and-duplicate frequency diversity further comprises frequency-shifting.

* * * * *